May 6, 1969 E. RINGGER 3,442,074
WATCH REGULATOR HAVING FINE ADJUSTMENT MEANS
Filed Nov. 13, 1967 Sheet 1 of 2

Inventor
Emil Ringger
By Stevens, Davis, Miller & Mosher
Attorneys

United States Patent Office 3,442,074
Patented May 6, 1969

3,442,074
WATCH REGULATOR HAVING FINE
ADJUSTMENT MEANS
Emil Ringger, Grenchen, Switzerland, assignor to A. Schild
S.A., Grenchen, Solothurn, Switzerland, organized under
the laws of Switzerland
Filed Nov. 13, 1967, Ser. No. 682,077
Claims priority, application Switzerland, Nov. 18, 1966,
16,578/66
Int. Cl. G04b 17/14
U.S. Cl. 58—109  11 Claims

ABSTRACT OF THE DISCLOSURE

A watch regulator having an adjustment means therefor permitting coarse adjustments to be made without the necessity to disengage the adjustment means from the regulator whereby fine adjustments may immediately be made thereafter. The adjustment means comprises a control lever pivoted in the regulator and also in a slide member which is slidably adjustable along the surface of the balance cock, displacement of said slide member effecting coarse adjustments while displacements of said control lever effecting fine adjustments.

---

Figure 1:
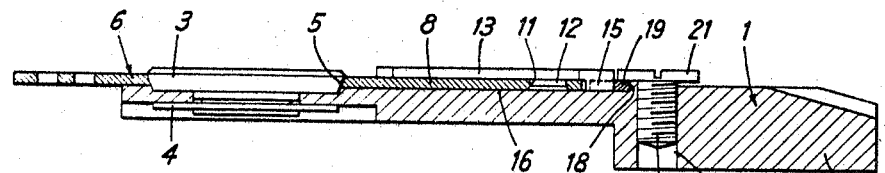

This invention relates to a watch regulator having an improved means whereby adjustments of the regulator can be performed in two stages, one stage permitting a coarse adjustment and a second stage permitting a fine adjustment.

Continued developments in the precision of watch movements creates a need for concomitant developments and improvements in the adjusting means for said movements. Specifically, improved precision means are required in order to adjust the balance mainspring frequency to a value which is as close as possible to its theoretical design frequency. To this end various adjustments means have been proposed and are known which include a hand-actuable control member which translates a relatively coarse or large adjusting movement by the watchmaker into a relatively fine or minimum displacement of the regulator itself. Such known devices, therefore, perform a step-down or reduction action as a means of amplifying the degree of precision which is normally attainable with the human hand. A disadvantage in known devices, however, is that they can provide the required accuracy of adjustment only if they are very accurately adjusted in the first instance and also be designed and manufactured so as to have no play between respective moving parts thereof.

Known devices, further, suffer from the drawback that prior to being utilized in order to effect a fine adjustment of the regulator, the regulator itself must first be moved to approximately the desired position therefor and then the fine adjustment means is utilized in order to effect the fine adjustment. Alternatively, various known devices require repeated manipulations by the watchmaker in order to achieve the final adjustment of the regulator.

This invention provides a regulator adjustment means which permits a preliminary coarse or rough adjustment of the regulator without the necessity of disengaging the fine adjustment means therefrom so that a subsequent fine adjustment can then be performed easily and rapidly.

An object of this invention, therefore, is to provide an improved regulator adjusting means for a watch regulator.

A further object is to provide a regulator adjusting means which permits very fine and accurate adjustments to be made in an easy and rapid manner.

A further object is to provide a regulator adjusting means which permits the regulator itself to be roughly adjusted without the necessity of disengaging the adjusting means from the regulator, and which thereafter is itself available for performing a fine adjustment on the regulator.

Other objects are those which are inherent and/or obvious in the invention which is hereafter described with reference to the accompanying drawings wherein various preferred embodiments are illustrated and wherein identical reference characters are employed to denote identical parts in the various figures.

Figure 2:
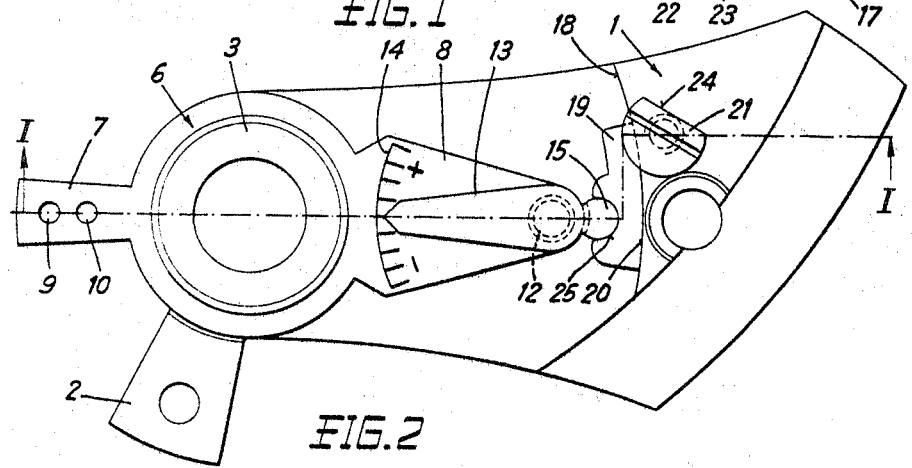
Figure 3:
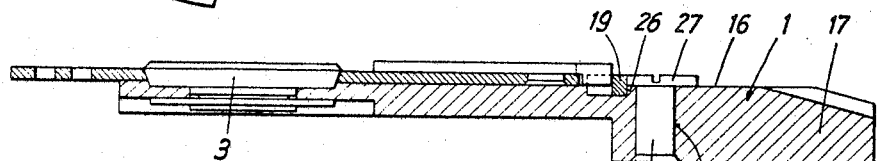
Figure 4:
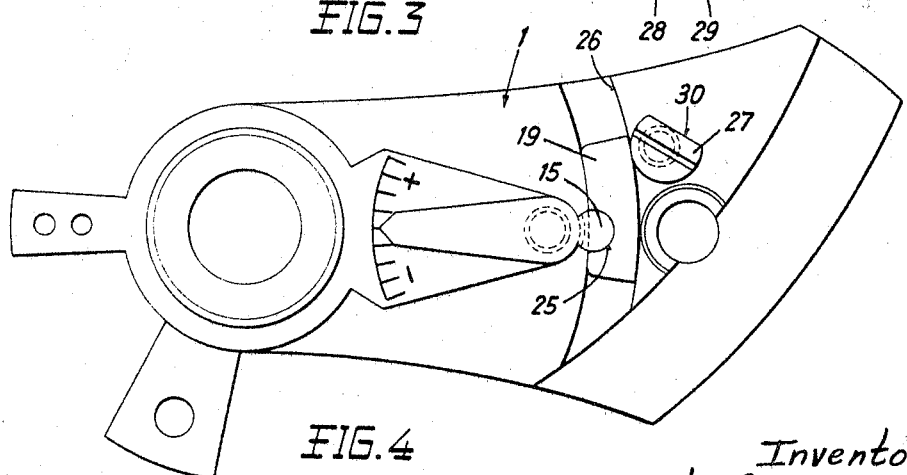
Figure 5:
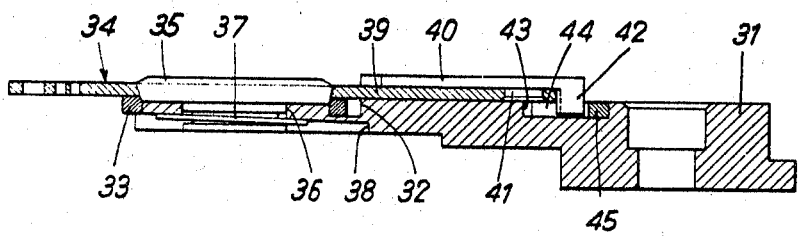
Figure 6:
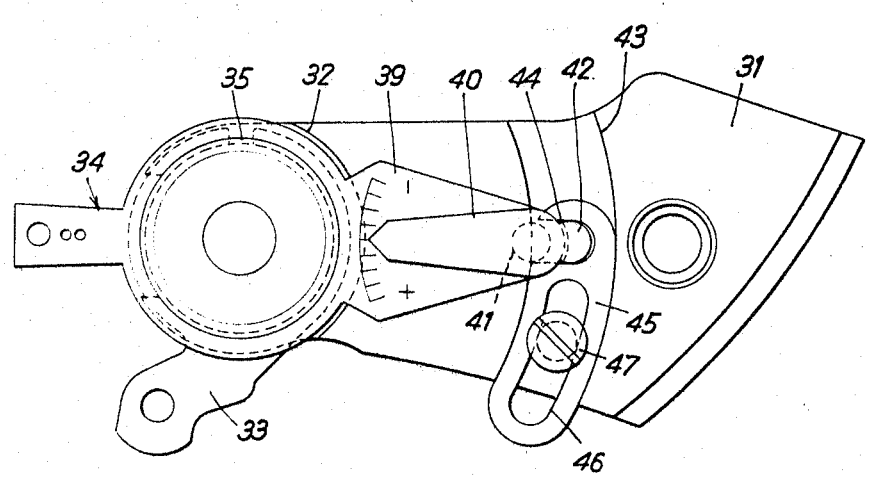

In the drawings:

FIGURES 1 and 2 are views of a first embodiment of the invention, with FIGURE 2 being a plan view and FIGURE 1 being a sectional view taken along line I—I of FIGURE 2;

FIGURES 3 and 4 are analogous views to those of FIGURES 1 and 2 but relating to a second embodiment of the invention; and, FIGURES 5 and 6 are analogous views to those of FIGURES 1 and 2 of a third embodiment of the invention.

The frame element 1 shown in FIGURE 1 is the balance cock of a watch movement. This cock has a lateral lug 2 which acts as stud holder but it is well known that this stud holder could also be a moveable independent part rotatably mounted on bearing 3 which is secured in an opening of the plate portion of the balance cock 1 by a bolt 4. The upper part of the frusto-conical bearing surface 5 of the bearing body 3 is engaged in a circular opening in the regulator 6 which is formed of a cut metal plate. The regulator has two arms 7 and 8 diametrically opposite each other, the arm 7 being provided with two openings 9 and 10 intended to receive the regulator key and pin. The arm 7 extends along an extension of the central axis of the cock, while the arm 8, of lozenge shape, extends along the surface of the plate portion of the cock 1. At its end, said arm 8 has an opening 11 in which there is engaged and clamped the stud shaft 12 of a drive arm 13. The drive arm 13 extends in the direction of the axis of the regulator above the arm 8. Upon pivoting of drive arm 13 around the stud 12, its end sweeps the wider portion of the arm 8 which is provided with a graduated scale 14. The drive arm 13 can be made by being stamped and cut to include the stud 12 and a protruding end element or knuckle 15 which overlaps and extends downward into the plane of the front end of the arm 8 to the level of the plate portion of the cock 1. The flat upper surface 16 of cock 1 is delimited from the cock seat portion 17 by a circular shoulder 18 which extends upwardly from the surface 16 along an arc which is concentric with the axis of the bearing 3. A cut plate 19 forming a slide and having an arcuate edge 20 can move along the shoulder 18, its edge 20 being in sliding contact with the said shoulder. This slide has a thickness slightly greater than the height of the shoulder 18 and it can be locked against movement by the flat head 21 of a screw 22 which is threadedly engaged in a tapped hole 23 in the solid portion 17 of the cock 1. The head 21 has a flat peripheral portion 24 which, when oriented tangentially to the shoulder 18, permits movement of the slide 19. An arcuate notch 25 of a diameter corresponding to that of the circular knuckle 15 receives the latter therewithin, the said elements being fitted together with light friction therebetween. In order to permit the operating of the device, the notch 25 must be slightly flared at its two ends.

As can be noted from FIGURE 1, it is sufficient to loosen the screw 22 in order to permit a preliminary rapid displacement to a relatively large extent of the regulator 6 by means, for instance, of the arm 7 being urged to pivot about 3, the slide 19 thereby being carried along by the knuckle 15. Once this preliminary adjustment has thus been effected, the slide 19 can be locked by means of the screw 22 and one can operate the arm 13 which functions as an eccentric while pivoting in the notch 25 and thereby brings about a precisely controllable displacement of the arm 8 of the regulator. It is seen, therefore, that by successive displacements of the slide 19 and of the position of the arm 13, one can ultimately adjust the position of the regulator in such a manner that the frequency of the system consisting of the balance and the mainspring corresponds as closely as possible to the design theoretical frequency and that furthermore that the arm 13 is aligned along the axis of the regulator.

It is furthermore seen that the angle of displacement of the regulator is approximately proportional to the ratio of the arcuate displacement of the free end of the arm 13 to the length of said arm, multiplied by the ratio of the distance from the axis of the knuckle 15 to that of the stud 12 and the distance from the axis of the stud 12 to that of the regulator. The device, therefore, makes possible a very high step-down ratio of the movements within a very small space.

The embodiments of FIGURES 3 and 4 has exactly the same features as that of FIGURES 1 and 2; however, the upper surface 16′ of the plate portion of the cock 1 extends in the same plane or at the same level as the top of the seat portion 17, and the guide means for the slide 19′ is in this case formed by a groove 26 having the shape of a circular arc which is concentric with the bearing 3. Slide 19′ is fitted within arcuate groove 35 so as to slide therein without play. This slide protrudes above the upper face 16′ of the plate portion of the cock so that the notch 25 can engage about the knuckle 15. The slide is locked by an eccentric 27, the stud 28 of which is held fast in a cylindrical opening 29 of the seat portion 17. This eccentric is provided, similarly to the screw 22, with a diametral slot which makes it possible to actuate it by means of a screwdriver and to bring it into the position whereby it blocks the slide 19 by pressing it radially against the inner side of the groove 26. The eccentric 27 also has a flat portion 30 which when brought into a position whereby it is tangential to the outer flank of the groove 26 permits the positioning of the slide 19.

The rotational axis of the eccentric 27, as also that of the screw 22 in FIGURE 1, is selected so that whatever is the position of the slide 19 along the arcuate extent of the groove 26, said eccentric can block the slide. The arcuate length of the slide 19 can be selected so that regardless of the position of the axis of the knuckle 15 along the arcuate extent of groove 26 or of shoulder 18, the maximum angular extent to which the slide 19 or 19′ can be adjusted during a preliminary rough adjustment (that is: by gripping tongue 7 to turn regulator 6) will be dependent upon the ratio of the arcuate length of the groove 26 or shoulder 18 to the radius or curvature of said groove or shoulder.

The device shown in FIGURES 5 and 6 comprises a movable stud holder 33 which is guided in an arcuate groove 32 which the cock 31 has at the end of its plate.

The regulator 34 which extends at the level of the upper face of the plate of the cock pivots around a bearing body 35, the central portion of which is engaged in an opening 36 coaxial with the groove 32. The bearing body is secured by a bolt 37 pressed elastically against the obliquely milled lower face of a recess 38 provided in the lower face of the cock. The tail 39 of the regulator has substantially the same shape as in the previous two embodiments, and to its end there is articulated a control member 40, the stud 41 of which is riveted in an opening provided in the tail 39, so as to be able to pivot on said tail. The control member 40 at a point in front of the tail 39 comprises a crescent-shaped knuckle 42 which extends into a groove 43 which has the shape of a circular arc centered on the balance staff and provided in the upper face of the cock 31. The knuckle or pivot element 43 is engaged in a notch 44, having parallel sides and a rounded bottom, which is provided in a movable part 45 capable of sliding in the groove 43. This part has, alongside the notch 44, an elongated slot or opening 46. A screw 47 screwed in the cock through the opening 46 makes it possible to secure part 45 in such a position that the notch 44 is arranged along a radius extending from the axis of the balance staff. The head of the screw 47 extends at the level of the regulator. This arrangement has the advantage over that shown in FIGURES 1 to 4 of providing a better guidance for the sliding part 45. Furthermore, the screw 47 holds the sliding part permanently even if it is slightly loosened. As the guiding is better, the opening of the device is also simpler and therefore faster. In order to effect an adjustment, it is sufficient to slightly loosen the screw 47 and then move the part 45 until approximately the correct adjustment has been obtained. The screw 47 is then tightened and the fine adjustment effected by means of the lever 40 whose end moves across the graduations borne by the tail of the regulator. The cylindrical lateral face of the knuckle 42 then slides in the notch 44, causing the control member 40 to pivot around its axis and thereby displace the regulator by the desired amount. The maximum rough adjustment range is equal to the length of the elongated opening 46. Of course, depending on the shape of the cock, the part 45 may be so shaped that the opening 46 is on one side or the other of the tail of the regulator with respect to the position of the stud holder.

The herein presented details of various preferred embodiments are given by way of illustration only and are not intended to be limitative of the modes of realization of the invention as herein disclosed and defined, said modes of realization being intended to apply to all modifications, substitutions, equivalents or any other expedients which are either obvious or well within the purview of one skilled in the art.

What is claimed is:

1. A watch movement regulator device, comprising: a balance cock and a regulator pivotally mounted thereon about a regulator pivot axis, an adjustment means for said regulator comprising a control member pivotally mounted about a control member pivot axis which is parallel to said regulator pivot axis and a coarse adjustment means mounted on said cock and displaceable therealong along a circular arc which is concentric with said regulator pivot axis, a portion of said control member being pivotally engaged with said coarse adjustment means.

2. The regulator device of claim 1, wherein said control member is pivotally mounted on said regulator about an axis which is fixed relative to said regulator and wherein said control member portion is pivotally engaged with said coarse adjustment means about a third axis which is parallel to each of the aforementioned axes.

3. The regulator device of claim 1, including a locking means for locking said coarse adjustment means at either of various positions along the extent of said arc.

4. The regulator device of claim 1, said control member comprising a lever pivoted about said control member axis and having two arms, one of said arms being free and being adapted to be hand actuated and the other of said arms being pivotally engaged with said connecting means.

5. The regulator device of claim 4, including a locking means for locking said coarse adjustment means at either of various positions along the extent of said arc, whereby pivoting of said lever about said control member axis while said coarse adjustment means is locked at a particular position along said arc results in angular displacement of said regulator about its pivot axis and displacement of said coarse adjustment means along said arc also results in angular displacement of said regulator about its pivot axis.

6. The regulator device of claim 5, said one arm being substantially longer than said other arm whereby a hand actuated angular displacement of said one arm is stepped down to a relatively small angular displacement of said regulator.

7. The regulator device of claim 4, said regulator comprising a tail portion extending radially away from the regulator pivot axis, said lever being pivoted on the end of said tail portion with said one arm extending from said control member axis back towards the regulator axis along a radius line extending therefrom and said other arm extending in a direction away from said regulator axis and towards said coarse adjustment means.

8. The regulator device of claim 1, said coarse adjustment means comprising a slide member and guide means defining said arcular arc along the surface of said balance cock, said slide member being constrained to travel only along said guide means.

9. The regulator device of claim 8, said guide means comprising a raised circularly arcuate shoulder along the surface of said balance cock, said slide member having an arcuate side thereof in sliding contact along said shoulder, a locking means for locking said slide member at any position along the arcuate extent of said shoulder and comprising a locking member having a shaft portion threadedly received in said balance cock and a radially larger head portion, said locking member being threadedly turnable in said balance cock and its head portion being circumferentially configured whereby a circumferential extent thereof is adapted to lie tangentially adjacent to said arcuate side of said slide member or another portion of said head portion is adapted to radially overlap said slide member and axially press same against the surface of said balance cock and thereby lock same in place thereon.

10. The regulator device of claim 8, said guide means comprising an arcuate groove defined by inner and outer radial arcuate walls in the surface of said balance cock, said slide member being radially contrained on both sides thereof between the opposite walls of said groove, a locking means for selectively locking said slide member at any position along the arcuate extent of said groove comprising a rotatable eccentric having an eccentric surface which bears against one radial side of said slide member and is thereby adapted to urge said slide member into locking frictional engagement against one arcuate wall of said groove.

11. The regulator device of claim 8, said guide means comprising an arcuate groove defined by inner and outer radial arcuate walls in the surface of said balance cock, said slide member comprising an arcuate link member having an arcuately extending slot along the arcuate extent thereof, a headed screw member extending through said slot and threadedly received in said balance cock, said screw member being adapted to secure said link member at any position along said groove within the limits of the length of said slot, said link member being slidably engaged within said arcuate groove.

References Cited
UNITED STATES PATENTS 3,306,026  2/1967  Kocher _____ 58—109

OTHER REFERENCES

German published application Nos. 1,217,284, May 1966, Parechoc S.A. 1,233,782, February 1967, Junghans.

RICHARD B. WILKINSON, *Primary Examiner.*

STANLEY A. WALL, *Assistant Examiner.*